Patented June 23, 1953

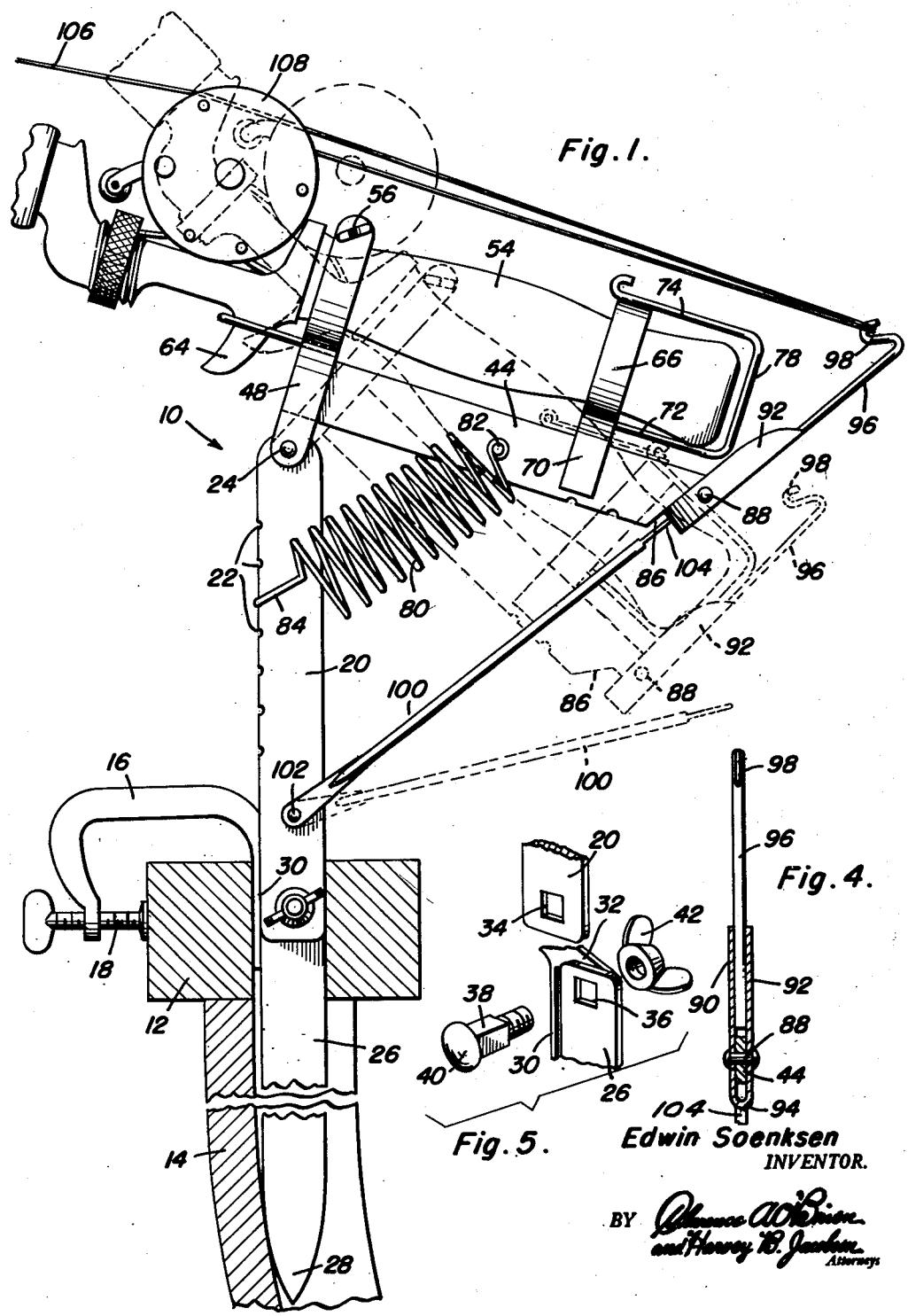

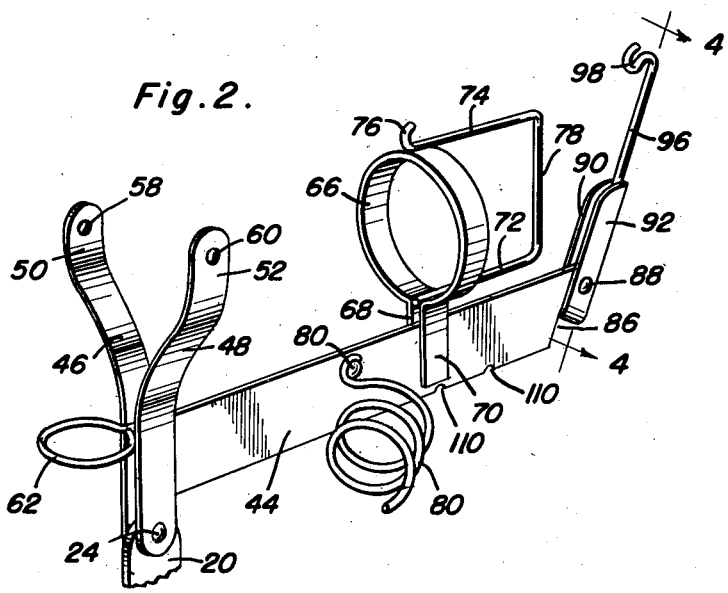
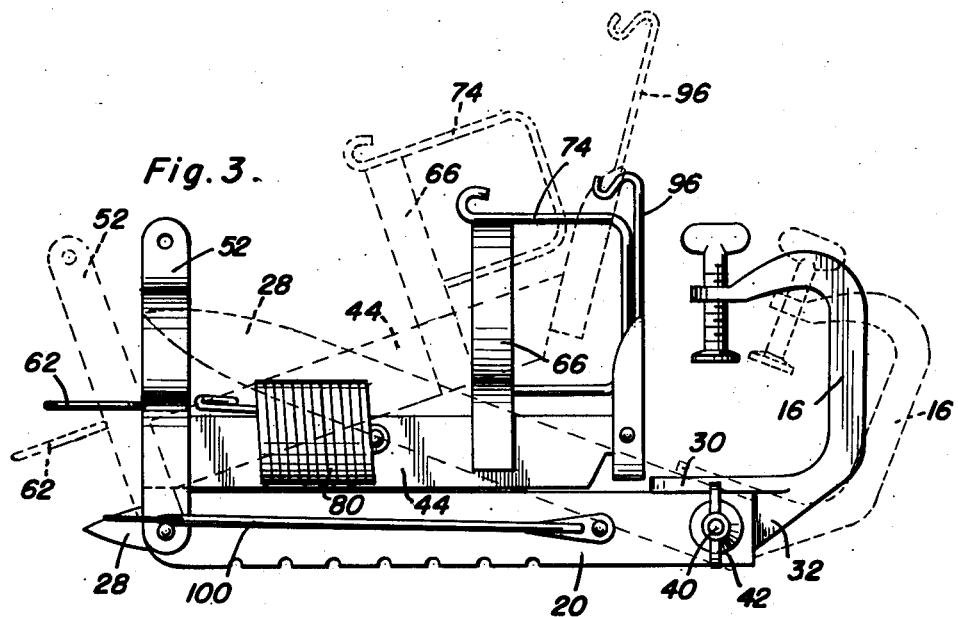

2,642,690

UNITED STATES PATENT OFFICE 2,642,690

FISHING ROD HOLDER

Edwin Soenksen, De Witt, Iowa

Application January 5, 1950, Serial No. 136,857

4 Claims. (Cl. 43—15)

This invention comprises novel and useful improvements in a fishing rod holder, and more specifically pertains to an improved fishing rod holder which is capable of responding to a tug upon a fishing line by a fish taking the bait, for imparting a snap action or jerk to the fishing rod in order to sink the fishhook in the mouth of the fish.

The principal object of this invention is to provide an improved fishing rod holder which, upon a tug on a fishing line occasioned by a fish seizing the bait, will cause the actuation of a mechanism for imparting a snap action jerk to the fishing rod for sinking the fishhook in the mouth of a fish.

These, together with various ancillary features and objects of the invention which will later become apparent as the following description proceeds, are attained by the present invention, a preferred embodiment of which has been illustrated by way of example only in the accompanying drawings, wherein:

Figure 1 is a fragmentary side elevational view showing a satisfactory embodiment of the invention incorporating the principles thereof, parts being broken away, the device being shown in full lines in its operative position, mounted upon the side of a boat or the like for holding a fishing rod in readiness for actuation of the trigger mechanism, and showing in dotted lines the alternative position of the parts immediately after the trigger mechanism has been actuated by a tug upon the fishing line;

Figure 2 is a perspective view showing certain structural details and elements of the improved fishing rod holder of Figure 1, the same being shown removed from the rod handle of a fishing rod;

Figure 3 is a side elevational view, showing in full lines the compactly folded arrangement of the device, and showing in dotted lines positions which the parts assume in opening the device from its collapsed or folded position;

Figure 4 is a vertical transverse sectional detail view taken substantially on the plane indicated by the section line 4—4 of Figure 2; and Figure 5 is a fragmentary perspective detail assembly view showing certain elements of the invention.

Referring now more specifically to the accompanying drawings, wherein like numerals designate similar parts throughout the various views, it will be seen that the improved holder illustrated as embodying the principles of this invention is indicated generally by the numeral 10, and in Figure 1 is shown as being mounted upon a portion of the top rail 12 forming a part of the side 14 of a boat or the like.

The fishing rod holder itself includes a support by means of which the entire device may be mounted either upon the side of a boat as illustrated in Figure 1, or alternatively may be anchored by merely thrusting the depending pointed end of the device into the soil. To effect this purpose, the support includes a conventional form of clamp 16, the same being provided with a thumb screw 18 by means of which the clamp may be anchored upon the top rail 12 of a boat side as illustrated. The clamp is of the U- or C-shaped construction, although it will be understood that the principles of the invention are not limited to any particular form of clamp per se. Indicated at 20 is a member constituting a support for the device, this member being conveniently in the form of an elongated metallic strip or bar, with a plurality of longitudinally spaced notches 22 along one edge thereof. At its upper end, this bar is pivotally engaged by a pivot pin 24 by means of which the rod holder is pivotally attached to the support 20, as will be set forth hereinafter. At its lower extremity, the support 20 is pivotally attached to the clamp 16 and to a lower bar or member 26 which may conveniently be provided with a pointed extremity 28, by means of a common fastening.

Attention is now directed more specifically to Figures 1, 3 and 5 for an understanding of this pivotal connection. The clamp 16 is provided with a perpendicularly disposed flange 30 for engagement against the top rail 12 of the boat side, as shown in Figure 1, and a perpendicularly disposed plate 32 is integrally formed upon the flange 30, and this plate 32 is employed to angularly and adjustably secure the adjacent extremities of the support 20 and the depending bar 26. Non-circular apertures, such as those shown at 34 and 36, are provided in the adjacent ends of the members 20 and 26, and a similar aperture, not shown, is provided in the plate 32 of the flange 30. These apertures are aligned and are adapted to receive, in non-rotatable relation, the correspondingly shaped shouldered portion 38 of a fastening bolt 40 having a wing nut 42. By this means, the members 32, 20 and 26 may be pivotally secured together and may be selectively locked in different angular positions of adjustment, depending upon the shapes of the shoulder 38 and the apertures previously mentioned. In the operative position shown in Figure 1, the members 20 and 26 are disposed in alignment with each other and on opposite sides of the bolt 40, the shouldered engagement of the latter with the three non-circular recesses serving to lock or retain the clamp, the support 20, and the depending bar 26 in the aforesaid adjusted position. In order to effect a change in the angular relation of these three members, it is merely necessary to loosen the wing nut 42 upon the bolt 40, so that the non-circular apertures are disposed upon the circular, threaded portion of the bolt, whereupon the angular relation of the parts may be changed in accordance with the shape of the shoulder and apertures, and the device again locked in adjusted position.

It should be here noted that when the device is in the position shown in Figure 1, the depending portion 26 serves to abut the side of the boat 14, and thus assists in steadying and embracing the support for this use. Alternatively, as will be readily understood, the clamp may remain in the position shown in Figure 1 or may be removed from the device when it is intended to employ the support to anchor the rod holder on land, and for this purpose the pointed extremity 28 of the depending portion 26 will be embedded in the soil at any desired angle for properly positioning the rod holder.

Attention is next directed more specifically to Figure 2 for an understanding of the construction of the rod holder itself. The latter conveniently comprises a support bar which at or adjacent one extremity is provided with a yoke consisting of a pair of strap members 46 and 48 which are rigidly attached to opposite sides of the support bar 44 in any desired manner, and which extend transversely thereof, one end of these strap members being connected by the above mentioned pivot pin 24 to the upper end of the support 20 and pivotal movement thereon. The other ends of these strap members are curved upwardly and outwardly to terminate in spaced extremities 50 and 52, which thus constitute a yoke between which may be rested, as shown in Figure 1, what may be termed the inner portion of the handle 54 of a fishing rod. This inner portion of the handle 54 is seated upon the inwardly converging portions of the members 46 and 48, and is retained in seated position as by means of a cotter pin or the like 56 which is removably extended through aligned apertures 58 and 60 in the above mentioned extremities 50 and 52.

The support bar 44 further includes an endwise extending ring or loop 62 which is adapted to receive, as shown in Figure 1, the finger grip projection 64 with which many forms of conventional rod handles 54 are provided. The engagement of the finger grip portion 64 of the handle in the loop or ring 62 prevents effectively an endwise withdrawal of the fishing rod from its engagement in the rod holder. Between its ends, and preferably adjacent its other extremity, the support bar 44 is provided with a socket for receiving the outer end of the rod handle 54. This socket may conveniently comprise a single strip of metal bent intermediate its ends to form a ring 66 and having its ends terminating in parallel portions 68 and 70 which embrace opposite sides of the support bar 44 and are rigidly attached thereto in any desired manner. The socket member is completed by a U-shaped wire or similar member having parallel legs 72 and 74 whose ends are rigidly attached in any desired fashion to the member 66, the leg 74 terminating in a backwardly bent hook portion 76, and the legs being connected by a mid-portion 78. The use of this socket member is shown in Figure 1 and further explanation is believed to be unnecessary.

A resilient means of any desired type, such as a tensioning spring 80, is terminally secured, as at 82, to the support bar 44 at any convenient point, and is provided at its other extremity with a hook portion 84 which slidably embraces the sides of the support 20, and is selectively engageable in one of the longitudinally spaced notches 22 thereon. It will be seen that by selectively positioning the hook 84 in one of the notches that the spring tension upon the holder for a given angular relation of the support bar 44 to the support 20 may be readily adjusted. The spring 80 yieldingly urges the support bar 44 in a clockwise direction with respect to the support 20 and thus, as viewed in Figure 1, resiliently urges the support bar and the holder carried thereby from the full line position to the dotted line position.

A latch and trigger mechanism to be now described is provided for maintaining the bar in a selected position, such as that shown in full lines in Figure 1, against the bias of the spring 80, this full line position being referred to as the operative or the cocked position of the holder.

Upon what may be termed its under surface, the support bar at its outer end is notched or cut away to provide an inclined shoulder 86. A trigger is pivoted, as at 88, to the outermost extremity of the support bar 44 for pivotal movement relative thereto and this trigger may conveniently comprise parallel side walls 90 and 92 with an integral bottom wall connecting the same as at 94, and has rigidly secured therebetween in any desired manner a rod or stem 96 having a trigger operator 98 in its upper extremity. The arrangement is such that the parallel side walls 90 and 92 slidably embrace the extremity of the support bar 44 for pivotal movement relative thereto, and the stem 96 is rigidly attached to the side walls for movement therewith. The bottom portion 94 of the trigger is thus movable within the previously mentioned notch, and the shouldered portion 86 thereof constitutes the stop for limiting clockwise pivotal movement of the trigger in the arrangement shown in Figures 1 and 2. The arrangement is such that the trigger is free to pivot about the outermost end of the support bar 44 to which the same is pivotally connected, being limited in its pivotal movement by engagement of the above mentioned bottom wall 94 with the shoulder 86, and by engagement of the mid-portion 78 of the U-shaped socket member against the stem 96 between the side walls 90 and 92.

In conjunction with the trigger mechanism above described a latch means which may conveniently comprise a stem or bar 100, pivoted to the support 20, as at 102, and having a flattened blade-like extremity 104 which is adapted to extend within the notched portion of the support bar for engagement with the bottom wall 94, as shown in Figure 1.

From the foregoing, it is felt that the operation of this embodiment of the invention will now be readily understood. With the fishing rod handle 54 received in the socket and clamped to the holder by the cotter pin 56 extending through the yoke member, and with the hook or ring 62, the support bar 44 is cocked by rotating the same in a counter-clockwise direction about the pivot pin 24, thus tensioning the spring 80. The trigger mechanism is then disposed with the bottom wall 94 disposed within the notch, and the edge of the bottom wall abutting the stop shoulder 86, at which time the blade-like extremity 104 of the latch 100 is positioned within the notch and abutted against the bottom surface of the bottom wall 94. It should be noted that this blade engages the bottom surface of the bottom wall on the left side of a line joining the pivot pins 88 and 102, whereby the reaction of the tension of the spring on the support bar 44 and the abutting engagement of the trigger bottom wall 94 on the trigger bottom wall 94 on the latch 100 will cause a biasing of the trigger in a clockwise direction, which is limited by the stop shoulder 86. The fishing line 106 extends from the fishing rod reel 108 mounted upon the handle 54, about the above-mentioned trigger operator 98 of the trigger, and from thence through the guides upon the fishing rod, not shown, being provided with a hook upon its outer end, as is customary.

In this cocked position, the spring 80 thus urges the support bar in a clockwise direction, which, however, is prevented by engagement of the latch 100 with the trigger in the notch of the support bar. The force of this tensioning effect can be regulated by properly adjusting the position of the hook portion 84 of the spring in the notches 22, as above pointed out.

Upon the exertion of a predetermined tension upon the line 106, in the form of a jerk or tug upon the line, as when a fish strikes the bait upon the fishhook, the impulse of this tension exerted upon the hook portion 98 of the trigger, will cause a counter-clockwise pivoting of the trigger, thereby moving the blade 104 of the latch 100 from its seated engagement in the notch of the support bar. As soon as the engagement of the blade 104 with the trigger passes the line joining the centers of the pivot pins 88 and 102, the tension of the spring 80 is effected to impart a sudden clockwise rotation of the trigger, ejecting the latch 104 violently from its seated engagement in the notch, whereupon the spring 80 is effected to impart a sudden clockwise rotation of the holder about the pin 24 from the full line to the dotted line, and thus cause the fishing rod to give a jerk to the line 106, thus setting or sinking the fishhook into the mouth of the fish.

It will be further apparent that where the above mentioned automatic hook setting operation of the holder is not desired, the blade 104 may be selectively positioned in one of the notches 110, formed upon the under surface of the support bar 44, whereby the rod holder may be firmly secured at any particular angular relation desired with respect to the support 20.

The parts are so constructed that the device may be readily folded into the position shown in Figure 3 to enable the same to be compactly stored. For this purpose, upon loosening the bolt 40 and the wing nut 42 previously mentioned, the members 20 and 26 may be folded upon each other, the latch 100 may be folded along the support 20, the spring 80 may be folded about its connection 82 along the support bar 44, and the support bar itself folded in parallel relation to the support 20.

From the foregoing, it is thought that the construction and operation of the device, together with its many advantages, will be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A fish rod device comprising a support, a rod holder pivoted to said support, resilient means yieldingly urging said holder into a predetermined pivoted position upon said support, a keeper pivoted to said support and maintaining said holder outwardly of said predetermined position, a trigger pivoted to said holder and operatively engaging said keeper, and a trigger operator on said trigger for engagement and actuation by the line of a fishing rod mounted in said holder for release of said keeper by said trigger in response to a jerk upon the line, said trigger comprising a lever having a seat, said keeper being engageable with said seat, and said holder having a stop for preventing movement of said seat and trigger in one direction.

2. In combination, a support, a holder for a fishing rod, means pivoted to said support and rigidly secured to said holder for receiving the handle of a fishing rod, resilient means yieldingly urging said holder into a predetermined pivotal position upon said support, a keeper for maintaining said holder outwardly of said predetermined position, a trigger pivoted to said holder and operatively engageable with said keeper, the adjacent ends of said trigger and keeper being in abutting alignment and means for operating said trigger to release said keeper in response to a jerk on a fishing line.

3. The combination of claim 2 wherein said trigger terminally abuts an end of said keeper.

4. In combination, a support, a holder for a fishing rod, means pivoted to said support and rigidly secured to said holder for receiving the handle of a fishing rod, resilient means yieldingly urging said holder into a predetermined pivotal position upon said support, a keeper for maintaining said holder outwardly of said predetermined position, a trigger pivoted to said holder and operatively engageable with said keeper, means for operating said trigger to release said keeper in response to a jerk on a fishing line, said holder having a notch, the adjacent ends of said keeper and trigger being received in said notch, and a wall of said notch constituting a stop for retaining said adjacent ends of said trigger and keeper against separating movement in one direction.

EDWIN SOENKSEN.

References Cited in the file of this patent

UNITED STATES PATENTS

| Number | Name | Date |
| --- | --- | --- |
| 420,592 | Dayton | Feb. 4, 1890 |
| 693,071 | Rudd | Feb. 11, 1902 |
| 1,549,405 | Bjurstrom | Aug. 11, 1925 |
| 1,856,477 | Gerline | May 3, 1932 |
| 1,957,853 | Sibley | May 8, 1934 |

FOREIGN PATENTS

| Number | Country | Date |
| --- | --- | --- |
| 7,759 | Great Britain | of 1893 |